United States Patent
Shin

(10) Patent No.: US 12,549,120 B2
(45) Date of Patent: Feb. 10, 2026

(54) MOTOR CONTROL DEVICE, MOTOR CONTROL METHOD AND STEERING DEVICE

(71) Applicant: HL MANDO CORPORATION, Gyeonggi-do (KR)

(72) Inventor: Hyeung Shin, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 300 days.

(21) Appl. No.: 18/223,029

(22) Filed: Jul. 18, 2023

(65) Prior Publication Data

US 2024/0072702 A1   Feb. 29, 2024

(30) Foreign Application Priority Data

Aug. 24, 2022 (KR) .................. 10-2022-0106035

(51) Int. Cl.
*H02P 21/00* (2016.01)
*H02P 21/18* (2016.01)
*H02P 21/22* (2016.01)

(52) U.S. Cl.
CPC .............. *H02P 21/22* (2016.02); *H02P 21/18* (2016.02)

(58) Field of Classification Search
CPC .................................. H02P 21/22; H02P 21/18
USPC ..................................................... 318/400.02
See application file for complete search history.

(56) References Cited

U.S. PATENT DOCUMENTS

| | | | |
|---|---|---|---|
| 2006/0022626 A1* | 2/2006 | Kobayashi ............. | B62D 5/046 318/432 |
| 2012/0072077 A1* | 3/2012 | Park ...................... | G01L 25/003 701/42 |
| 2013/0278182 A1* | 10/2013 | Perisic .................. | B60L 15/025 318/400.02 |
| 2014/0091742 A1* | 4/2014 | Suzuki .................. | H02P 29/027 318/400.22 |
| 2015/0123581 A1* | 5/2015 | Omata ................... | H02P 29/032 318/400.17 |
| 2020/0076342 A1* | 3/2020 | Lee ....................... | B62D 5/0484 |
| 2022/0363308 A1* | 11/2022 | Lee ....................... | B62D 5/0484 |

* cited by examiner

*Primary Examiner* — Erick D Glass
(74) *Attorney, Agent, or Firm* — WOMBLE BOND DICKINSON (US) LLP

(57) ABSTRACT

The embodiments may provide a motor control device including three current sensors provided in each phase of a three-phase inverter connected to a motor to detect a current of each phase, and a controller configured to generate a control signal for the motor based on a detected current, and, in case of a failure of at least one of the three current sensors, determine an estimated current based on the number of faulty current sensors with the failure and generate a control signal for the motor based on the estimated current. According to the embodiments, it is possible to implement a motor control device capable of protecting the safety of a driver through a fault tolerant control in case of a failure of a current sensor.

9 Claims, 9 Drawing Sheets

MOTOR CONTROL DEVICE, MOTOR CONTROL METHOD AND STEERING DEVICE

CROSS REFERENCE TO RELATED APPLICATION

This application claims priority from Korean Patent Application No. 10-2022-0106035, filed on Aug. 24, 2022, which is hereby incorporated by reference for all purposes as if fully set forth herein.

TECHNICAL FIELD

Embodiments of the present disclosure relate to a motor control device and method, and a steering device capable of being applied to a vehicle.

In general, a steering system of a vehicle may refer to a system capable of changing a steering angle of a wheel based on a steering force (or rotational force) applied to a steering wheel by a driver of the vehicle. Recently, an electronic steering device has been applied to a vehicle in order to reduce a steering force of a steering wheel to ensure stability of a steering state.

The electronic steering device may drive a motor according to a speed state and torque state of the vehicle, and may provide the optimal steering condition by providing a light and comfortable steering feeling for the driver at low speed, a heavy and safe steering feeling for the driver at high speed, and rapid steering function to the driver in case of emergency.

Meanwhile, a phase current sensor of an inverter is an essential component for controlling the electronic steering device. The electronic steering system may provide torque control and current control. In the case of these controls, a closed-loop control may be performed, and an actual current is measured and used for the closed-loop control.

If a command torque and command current are not satisfied due to a failure of the current sensor, there may be possible to provide the desired steering and may be generated a noise and vibration. Therefore, there is a need for a method capable of controlling the steering more safely even if the phase current sensor of the inverter for the electronic steering device fails.

SUMMARY

In this background, embodiments of the present disclosure is to provide a motor control device and method, and a steering device based on a fault tolerant control method capable of providing the safe steering even if a failure occurs in a current sensor of a motor control device.

In an aspect of the present disclosure, there is provided a motor control device including three current sensors provided in each phase of a three-phase inverter connected to a motor to detect a current of each phase, and a controller configured to generate a control signal for the motor based on a detected current, and, if a failure occurs in at least one of the three current sensors, determine an estimated current based on the number of faulty current sensors with the failure and generate a control signal for the motor based on the estimated current.

In another aspect of the present disclosure, there is provided a motor control method including detecting current of each phase by three current sensors provided in each phase of a three-phase inverter connected to a motor, generating a control signal for the motor based on the detected current, and determining whether of a failure of at least one current sensor among the three current sensors, determining an estimated current based on the number of faulty current sensors with the failure, and generating a control signal for the motor based on the estimated current.

In another aspect of the present disclosure, there is provided a steering device including a motor, a three-phase inverter, three current sensors provided in each phase of the three-phase inverter connected to the motor to detect a current of each phase, and a controller configured to generate a control signal for the motor based on a detected current, and, if a failure occurs in at least one of the three current sensors, determine an estimated current based on the number of faulty current sensors with the failure and generate a control signal for the motor based on the estimated current.

According to the present disclosure, in case of a failure of a current sensor of a motor control device, a control signal for the motor may be generated by determining an appropriate estimated current based on the number of faulty current sensors, thereby providing a motor control device, a motor control method, and a steering device capable of safely steering even if a failure occurs in a current sensor of the motor control device.

DETAILED DESCRIPTION

Figure 1:
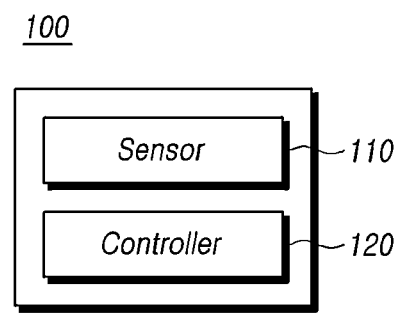
FIG. 1 is a block diagram of a motor control device according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the team "can".

Unless otherwise defined, all terms (including technical and scientific terms) used in the present disclosure will be used in a meaning that can be commonly understood by those of ordinary skill in the art to which the embodiments of the present disclosure belong. In addition, terms defined in commonly used dictionaries should be not interpreted ideally or excessively unless explicitly specifically defined. In addition, terms to be described later are terms defined in consideration of functions in the embodiments of the present disclosure, which may vary according to the intention or custom of a user or operator. Therefore, the definition thereof should be made based on the contents throughout this specification.

Hereinafter, it will be described a motor control device, a motor control method, and a steering device according to embodiments of the present disclosure with reference to the accompanying drawings.

Figure 2:
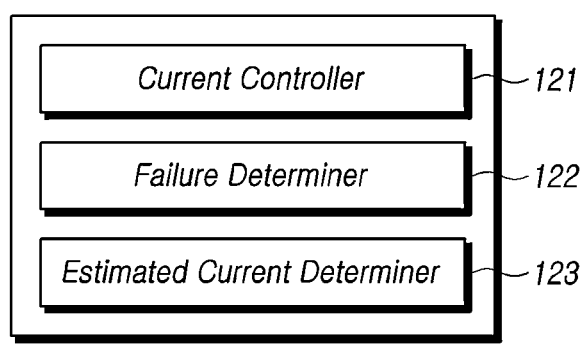
FIG. 2 is a block diagram of a controller included in a motor control device according to an embodiment of the present disclosure.

FIG. 1 is a block diagram of a motor control device according to the present disclosure. FIG. 2 is a block diagram of a controller included in a motor control device according to an embodiment of the present disclosure.

Referring to FIG. 1, a motor control device 100 according to embodiments of the present disclosure may include three current sensors 110 provided in each phase of a three-phase inverter connected to a motor to detect a current of each phase, and a controller 120 which generates a control signal for the motor based on a detected current, and, in case of a failure of at least one of the three current sensors, determines an estimated current based on the number of faulty current sensors with the failure and generates a control signal for the motor based on the estimated current. The motor control device 100 may further include other components in addition to the components shown in FIG. 1.

The motor may be provided in a steering device of a vehicle to output a steering force to provide an optimal steering state in the response to a steering operation performed by a driver of the vehicle. In the present disclosure, the motor may be a permanent magnet synchronous motor (PMSM) which applies a sine wave current with a sine wave counter electromotive force. Hereinafter, a description is provided on the assumption that the motor is a PMSM, however, it is not limited thereto, and an embodiment may be applied to other motors as long as it does not contradict the technical concept. In addition, the present disclosure has been described on the premise of a three-phase motor, but is not limited thereto.

The inverter may generate current by converting the DC voltage into an AC voltage, and may provide the generated current to the motor under the control of the controller 120. That is, if a user manipulates steering device, the inverter may provide current to the motor so that the motor may be driven according to a command torque or command current.

The current sensor 110 may be provided with three, one for each phase, between the motor and the three-phase inverter. The current sensor 110 may detect an output current of each phase of the inverter and transmit a value of the detected current to the controller 120.

The controller 120 may control the overall operation of the motor control device 100. For example, the controller 120 may be implemented as a micro controller unit (MCU), etc., and is not limited to a specific device as long as it can perform operations according to the present disclosure.

Referring to FIG. 2, the controller 120 of the motor control device 100 may include a current controller 121 which controls the current input to the inverter according to an input command torque, and a failure determiner 122 for determining whether of a failure of the current sensor 110, and an estimated current determiner 123 for determining an estimated current to control the motor if a failure occurs in the current sensor.

The current controller 121 may convert the current to be input to the inverter into a current or voltage on the d-q axis rotation coordinate system based on the received command torque or command current and the current measured by the current sensor 110. The current controller 121 may provide the converted values to the inverter as a control signal for the motor.

The failure determiner 122 may receive the current of each phase output from the inverter detected by the current sensor 110 to determine whether of a failure of the current sensors. According to an example, the failure determiner 122 may determine whether the three current sensors have failed based on a difference between a value of the detected current and a predetermined reference value. That is, if the value of the detected current is out of a predetermined range based on a preset reference value, the failure determiner 122 may determine that the current sensor detecting the corresponding current value has a failure.

Alternatively, according to another example, the failure determiner 122 may determine whether the current sensor has a failure based on whether the measured sum of three-phase currents represents 0. If the sum of the measured three-phase currents is not 0, the failure determiner 122 may determine that a failure has occurred in the current sensor, and then compare with a predetermined reference value as described above to determine the current sensor having a failure.

In the above, it has been described that the failure is determined by comparing the reference value and the detected value, but this is an example of a failure determination method, and the failure determination method is not limited thereto. In addition, in the present disclosure, it will be described a case in which the current sensor fails, but is not limited thereto. For example, the motor control method according to the present disclosure may be applied even if a current value detected by a current sensor varies due to a failure of a motor or an inverter in each phase.

As an example, if it is determined that one of the three current sensors has a failure, the current controller 121 may determine an estimated current based on the currents detected by the two normal current sensors.

For example, if it is assumed that a failure occurs in a current sensor for phase V among the current sensors, the following equation 1 may be used for the fault tolerant control.

[Equation 1]

$$U_{current} = U_{sensor} \quad 1)$$

$$W_{current} = W_{sensor} \quad 2)$$

$$V_{current} = -(U_{current} + W_{current}) \quad 3)$$

That is, since the U-phase and the W-phase are normal, the sensor detected current may be used as the corresponding phase current, and in the case of a faulty V-phase, the estimated current may be determined using the detected current of the other two phases. This is based on the fact that the sum of currents in three phases is zero.

The estimated current determiner 123 may determine the estimated current to generate a control signal for the motor if a failure occurs in two or more current sensors among the three current sensors. For example, if it is determined that two or more current sensors among the three current sensors have failed, the estimated current determiner 123 may determine the estimated current by a sensorless control equations (Equation 2 and 3) below based on an angular velocity detected from the motor. This is because the above-described Equation 1 cannot be used in the case that a failure occurs in two or three current sensors provided in three phases. The estimated current determiner 123 may determine a d-axis current and a q-axis current on the d-q axis rotation coordinate system as the estimated current.

$$i_{d\_sim}(k+1) = \quad \text{[Equation 2]}$$
$$i_{d\_sim}(k) + \frac{T_s}{L_d}\{v_{d\_sim}(k) + \omega_{est}(k)L_q i_{q\_sim}(k) - R_a i_{d\_sim}(k)\}$$

$$i_{q\_sim}(k+1) = i_{q\_sim}(k) + \quad \text{[Equation 3]}$$
$$\frac{T_s}{L_d}\{v_{q\_sim}(k) - \omega_{est}(k)\psi_a - \omega_{est}(k)L_d i_{d\_sim}(k) - R_a i_{q\_sim}(k)\}$$

Here, (k+1) and k denote the (k+1)th current estimation step and the kth current estimation step, respectively, Ts is the sampling period, Ld and Lq are the d-axis and q-axis inductances of the motor, and ω is an angular velocity of a rotor, Ra is a stator winding resistance, and Ψa is a motor speed constant.

The estimated current determiner 123 may input the determined estimated current to the current controller 121. The current controller 121 may generate an output signal to the inverter using the estimated current instead of using the value of the detected current. Accordingly, even when a failure occurs in the current sensor, the motor of the steering device may be controlled through sensorless control, so that fault tolerance control may be performed.

In the above, there has been described a case in which the estimated current is determined if two or more current sensors among the three current sensors have the failure. However, this is only an example and is not limited thereto. If necessary, the estimated current may be determined using Equations 2 and 3 even if one of the three current sensors fails.

In addition, there has been described a case of a three-phase motor, but is not limited thereto. For example, in the case that a six-phase motor is used, the steering device may include two three-phase inverters, and the above description may be substantially equally applied to each three-phase inverter.

According to embodiments of the present disclosure, if a failure occurs in the current sensor of the motor control device, an appropriate estimated current may be determined according to the number of faulty current sensors with the failure to generate a control signal for the motor. Accordingly, it is possible to provide a motor control device, a motor control method, and a steering device capable of safely steering even if a failure occurs in a current sensor of the motor control device.

Figure 3:
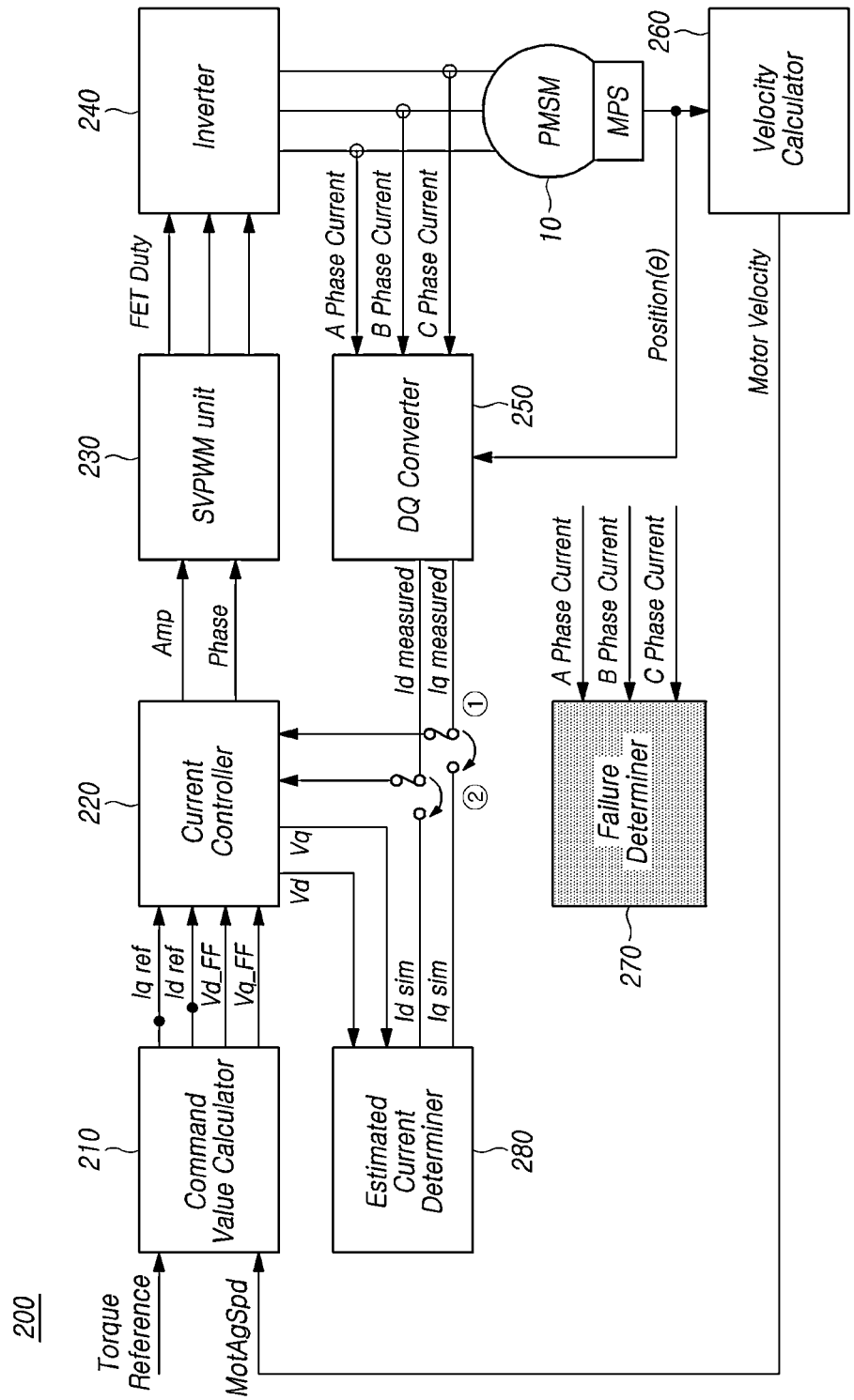
FIG. 3 is a block diagram for explaining torque control including a fault tolerant control according to an embodiment of the present disclosure.
Figure 4:
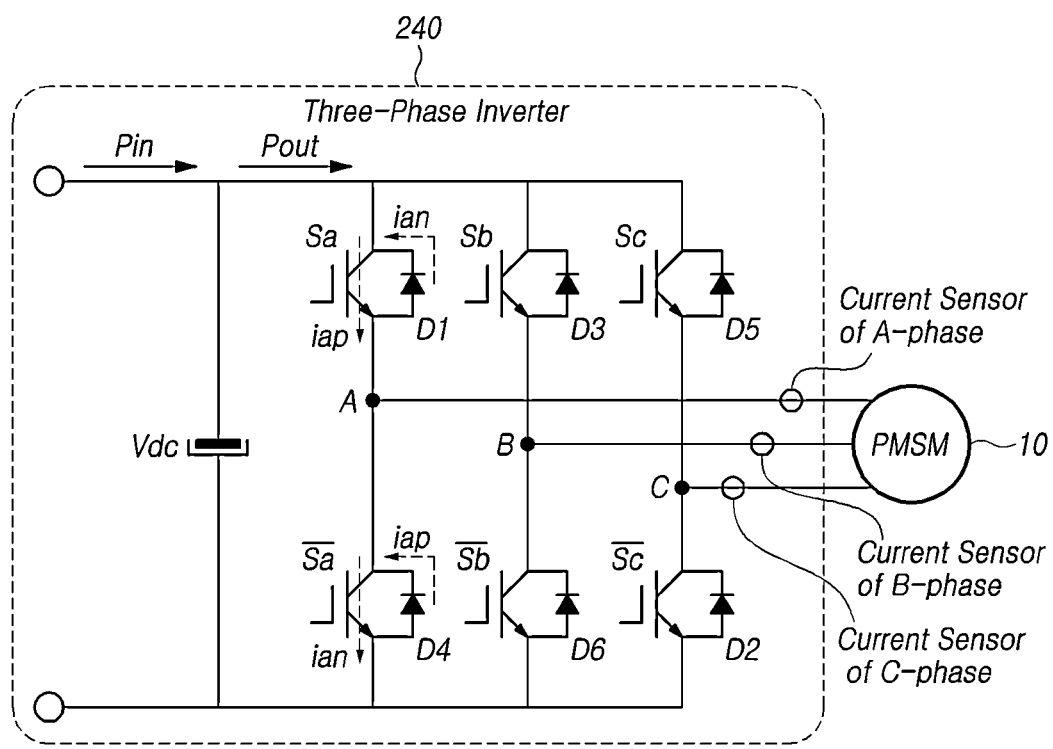
FIG. 4 illustrates an example of a three-phase inverter and a motor of a steering device according to an embodiment of the present disclosure.
Figure 5:
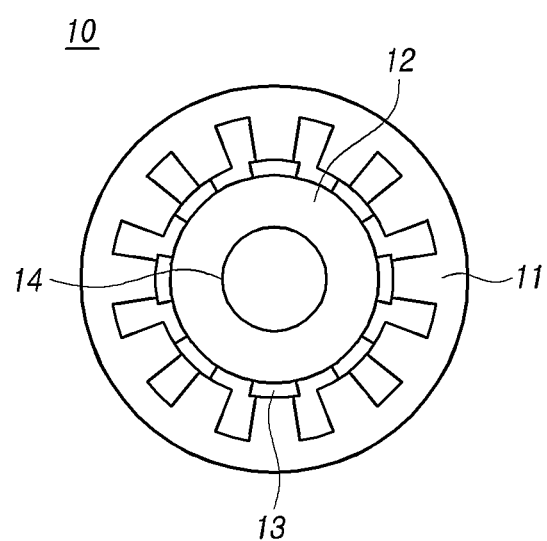
FIG. 5 illustrates an example of a shape of a permanent magnet synchronous motor according to an embodiment of the present disclosure.

FIG. 3 is a block diagram for explaining torque control including a fault tolerant control according to an embodiment of the present disclosure. FIG. 4 illustrates an example of a three-phase inverter and a motor of a steering device according to an embodiment of the present disclosure. FIG. 5 illustrates an example of a shape of a permanent magnet-type synchronous motor according to an embodiment of the present disclosure.

A steering device 200 according to an embodiment may include a motor 10, a three-phase inverter 240, and three current sensors 110 provided in each phase of the three-phase inverter connected to the motor to detect the current of each phase, and a controller 120 which generates a control signal for the motor based on a detected current, and, in case of a failure of at least one of the three current sensors, determines an estimated current based on the number of faulty current sensors with the failure and generates a control signal for the motor based on the estimated current. For example, the controller 120 may include a command value calculator 210, a current controller 220, a SVPWM unit 230, a DQ converter 250, a failure determiner 270, and an estimated current determiner 280.

Referring to FIG. 3, the command value calculator 210 may calculate command current and command voltage corresponding to a command torque and transfer the command current and command voltage to the current controller 220. The current controller 220 may output an input value to the SVPWM unit 230 based on the command current and command voltage, and the d-axis current and q-axis current detected and converted by the current sensor. The SVPWM unit 230 may modulate an input value through a space vector of a complex space and output the modulated value to the inverter 240. The inverter 240 may output current for controlling the motor 10 through three phases according to the corresponding input.

The current of each phase measured by the current sensors provided between the inverter 240 and the motor 10 may be input to the DQ convertor 250, and the DQ convertor 250 may convert the three-phase current into d-axis current and q-axis current on the d-q axis rotation coordinate system, and output the converted current to the current controller 220. Accordingly, there may be performed closed-loop control of the motor.

Meanwhile, the failure determiner 270 may also receive currents of each phase detected by the current sensors. As described above, the failure determiner 270 may determine whether the three current sensors have failed based on the difference between a detected current value and a predetermined reference value. Alternatively, the failure determiner 270 may determine whether of a failure of the current sensor based on whether the sum of the detected three-phase currents represents zero. However, this is an example, and it is not limited to a specific method as long as there can determine a failure of the current sensor.

As described above, if it is determined that one of the three current sensors has a failure, the current controller 220 may determine the estimated current corresponding to the faulty phase through Equation 1 described above based on the current detected by the two normal current sensors.

If it is determined that one of the three current sensors has a failure, the estimated current determiner 123 may calculate the estimated current through Equations 2 and 3 based on the angular velocity measured by the motor. In this case, the measured angular velocity may use the value measured by a velocity calculator 260. The current controller 220 may calculate an output value to the SVPWM unit 230 using the estimated current input from the estimated current determiner 280 instead of receiving the measured current from the DQ convertor 250. Accordingly, sensorless control may be performed without using a value measured by the current sensor.

FIG. 4 illustrates a connection relationship between the three-phase inverter 240 included in the steering device and the motor 10 in more detail. Here, Sn is an upper switch of n-phase, $\overline{Sn}$ is a lower switch of n-phase, Dn is the diode for each switch, Vdc is the battery voltage, and PMSM corresponds to a permanent magnet synchronous motor.

A current sensor of each phase may detect a current applied to the motor through a three-phase path to which the inverter 240 and the motor 10 are connected.

Referring to FIG. 5, the permanent magnet synchronous motor according to an embodiment of the present disclosure may have an 8-pole 12-slot structure. For example, the motor 10 is supplied with driving force by electricity, and may include a stator 11 and a rotor 12. For example, the stator 11 may be accommodated inside a housing and assembled by arranging a plurality of slots in an annular shape. Specifically, the rotor 12 is rotatably located inside the stator 11, a drive shaft 14 is coupled to the center of the stator 11, and a plurality of permanent magnets 13 may be inserted to be spaced apart along the outer circumference in the circumferential direction. In addition, in the motor 10, eight permanent magnets 13 are arranged so that the N poles and S poles are alternately spaced along the outer circumferential direction of the rotor 12, and the stator 11 may have a structure of 8 poles and 12 slots in which 12 slots are arranged and assembled in an annular shape. However, the structure of 8 poles and 12 slots has been described as an example, and is not limited thereto.

For example, the combination of the number of poles and the number of slots of the motor 10 may be determined in an initial design stage depending on a purpose of use and a driving method. For example, a counter electromotive force, which is one of the most important parameters in motor design, may be a factor that greatly affects the output and performance of the motor 10. Assuming that the motor 10 has the same number of conductors and the same volume of permanent magnets, the counter electromotive force may have different values depending on the combination of the number of poles and the number of slots.

Figure 6:
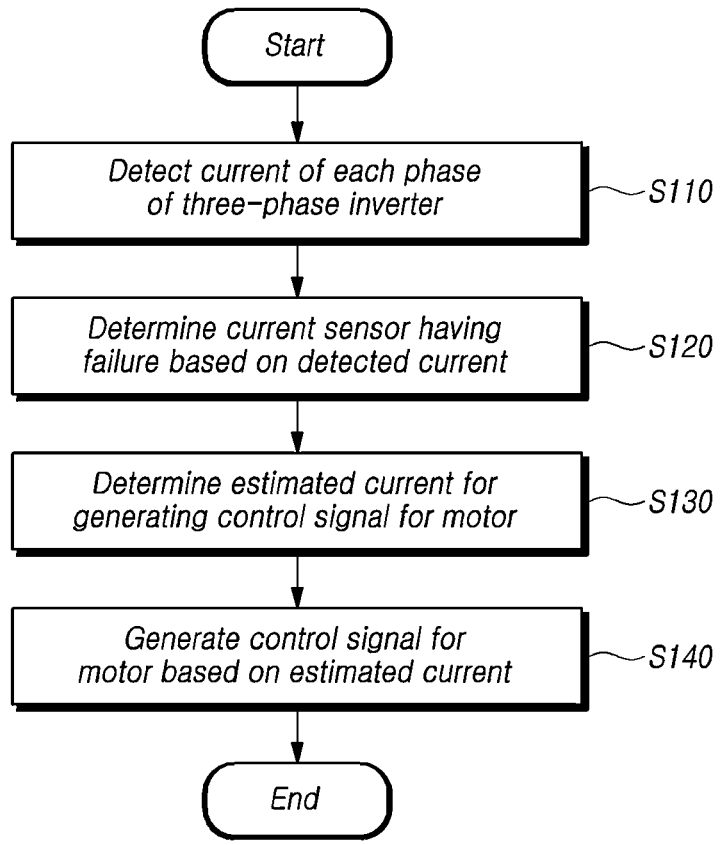
FIG. 6 is a flowchart of a motor control method according to an embodiment of the present disclosure.

FIG. 6 is a flowchart of a motor control method according to an embodiment of the present disclosure.

The motor control method according to the present disclosure may be implemented in the motor control device 100 described above. Hereinafter, with reference to necessary drawings, it will be described a motor control method according to the present disclosure and an operation of the motor control device 100 for implementing the method in detail.

Referring to FIG. 6, the motor control device 100 may detect the current of each phase through the three current sensors 110 respectively provided in each phase of the three-phase inverter connected to the motor (S110).

The motor control device 100 may include three current sensors, one for each phase, between the motor and the three-phase inverter. The motor control device 100 may detect an output current of each phase of the inverter through a current sensor.

Referring back to FIG. 6, a controller 120 of the motor control device 100 may generates a control signal for the motor based on the detected current, and may determine whether of a failure of at least one current sensor among the three current sensors (S120).

The controller 120 may convert the input current into a current or voltage on the d-q axis rotation coordinate system based on the received command torque or command current and the current detected by the current sensor. The controller 120 may provide the converted values to the inverter as a control signal for the motor.

The controller 120 may receive the current of each phase output from the inverter detected by the current sensor 110 to determine whether the current sensors have failed. According to an example, the controller 120 may determine whether the three current sensors have a failure based on a difference between the detected current value and a predetermined reference value. Alternatively, according to another example, the failure determiner 122 may determine whether the current sensor has a failure based on whether the sum of the detected three-phase currents represents zero.

Referring back to FIG. 6, the controller 120 may determine an estimated current based on the number of faulty current sensors (S130), and generate a control signal for the motor based on the estimated current.

According to an example, if it is determined that one current sensor among the three current sensors has a failure, the controller 120 may calculate an estimated current based on the currents detected by the two normal current sensors. For example, if it is assumed that a failure occurs in a current sensor provided in phase V among the current sensors, Equation 1 described above may be used for fault tolerant control.

The controller 120 may determine an estimated current to generate a control signal for a motor if a failure occurs in two or more current sensors among the three current sensors. According to an example, if it is determined that two or more current sensors among the three current sensors have a failure, the estimated current determiner 123 may determine the estimated current by Equations 2 and 3 based on the angular velocity detected from the motor. The controller 120 may determine the d-axis current and the q-axis current on the d-q axis rotation coordinate system as the estimated current.

The controller 120 may generate an output signal to the inverter using the estimated current instead of using the detected current value. Accordingly, even if a failure occurs in the current sensor, the motor of the steering device may be controlled through sensorless control, thereby performing the fault tolerant control.

Figure 7:
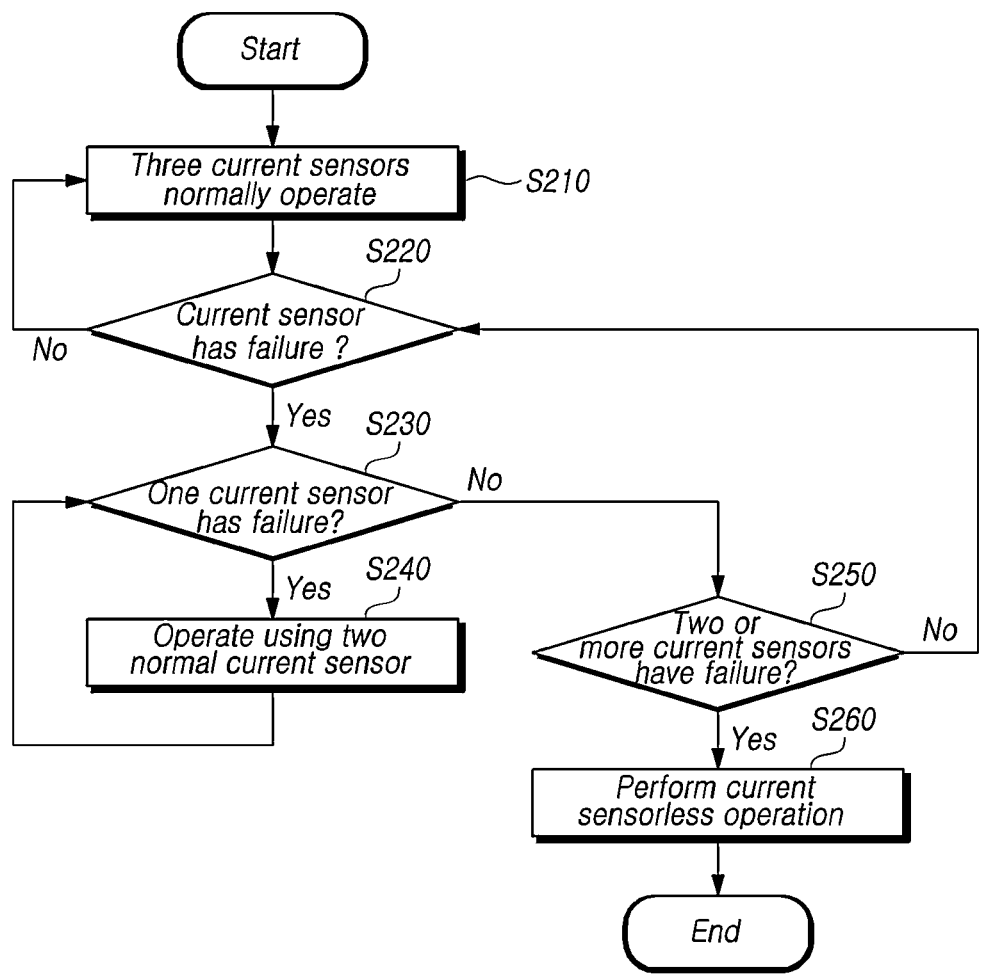
FIG. 7 is a flowchart for explaining a fault tolerant control method in a motor control method according to an embodiment of the present disclosure.

FIG. 7 is a flowchart for explaining a fault tolerant control method in a motor control method according to an embodiment of the present disclosure.

Referring to FIG. 7, according to the motor control method performed by the motor control device 100, in a normal state, the motor may be controlled through closed-loop control using current values detected by three normally operating current sensors (S210).

The motor control device 100 may perform an operation of determining whether the current sensor has a failure according to a predetermined time reference (S220). For example, the failure determination operation of the current sensor may be set to be performed continuously. Alternatively, the failure determination operation of the current sensor may be set to be performed according to a predetermined period. Alternatively, the failure determination operation of the current sensor may be set to be performed at different periods according to driving conditions such as driving speed and driving time of the vehicle equipped with the steering device of the present disclosure.

If it is determined that a failure of the current sensor has occurred (S220, Yes), the motor control device 100 may determine whether a failure has occurred in one current sensor (S230). If it is determined that one current sensor has a failure (S230, Yes), until the current sensor having a failure is repaired, the motor control device 100 may operate by calculating the current of the phase corresponding to the faulty current sensor using the current detected by the two normal current sensors (S240).

If it is determined that the number of faulty current sensors is not one (S230, No), the motor control device 100 may determine whether two or three current sensors have a failure (S250). If it is determined that two or three current sensors have a failure (S250, Yes), until the corresponding faulty current sensors are repaired, the motor control device 100 may perform a current sensorless operation of controlling the motor by determining the estimated current without using the current detected by the current sensor (S260]).

If it is determined that the two or three current sensors do not have a failure (S250, No), there may return to step S220 to determine whether the current sensor has a failure.

Accordingly, if a failure occurs in the current sensor of the motor control device, a control signal for the motor may be generated by determining an appropriate estimated current according to the number of current sensors having a failure, so that it is possible to provide a motor control device, a motor control method, and a steering device capable of safely steering even if a failure occurs in a current sensor of the motor control device.

Figure 8:
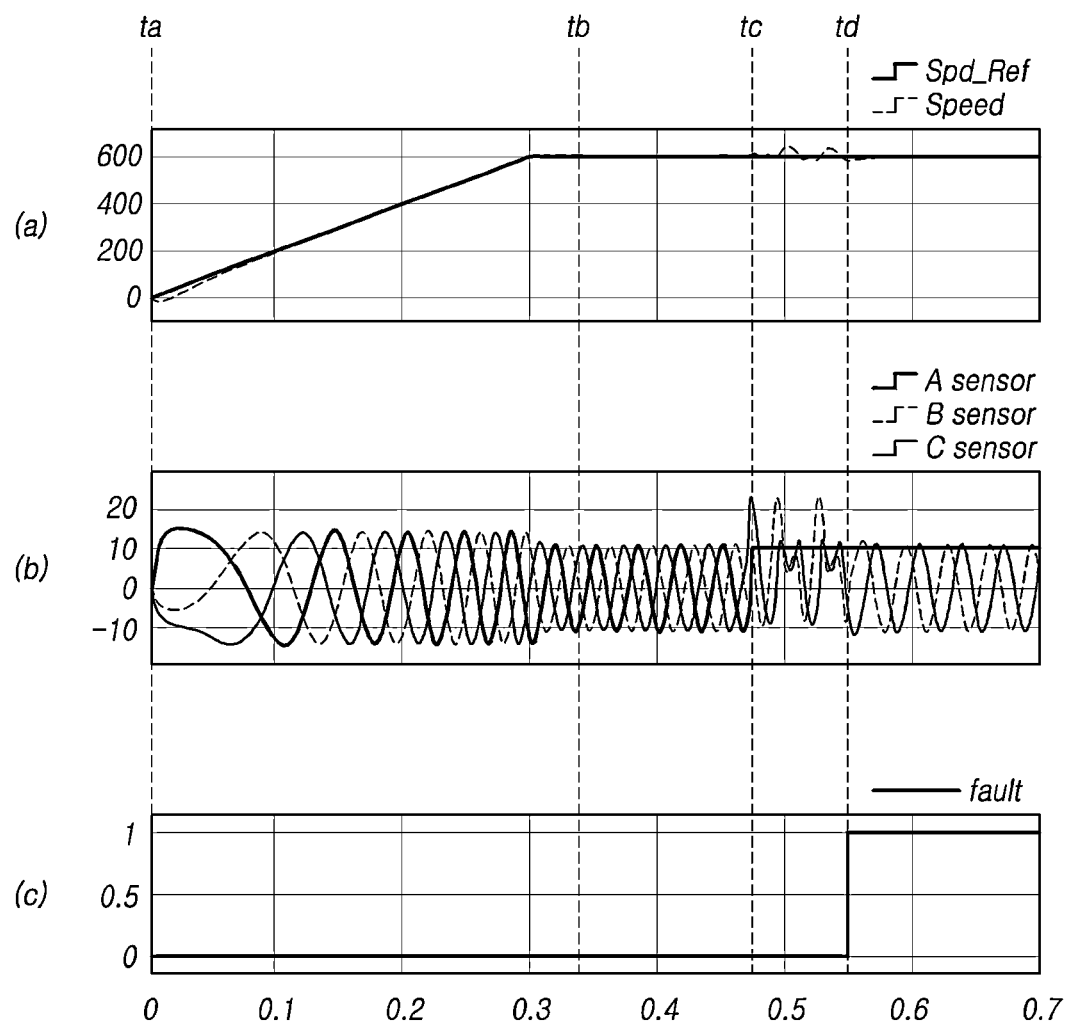
FIGS. 8 and 9 are diagrams for explaining the operation of a motor control method according to an embodiment of the present disclosure.
Figure 9:
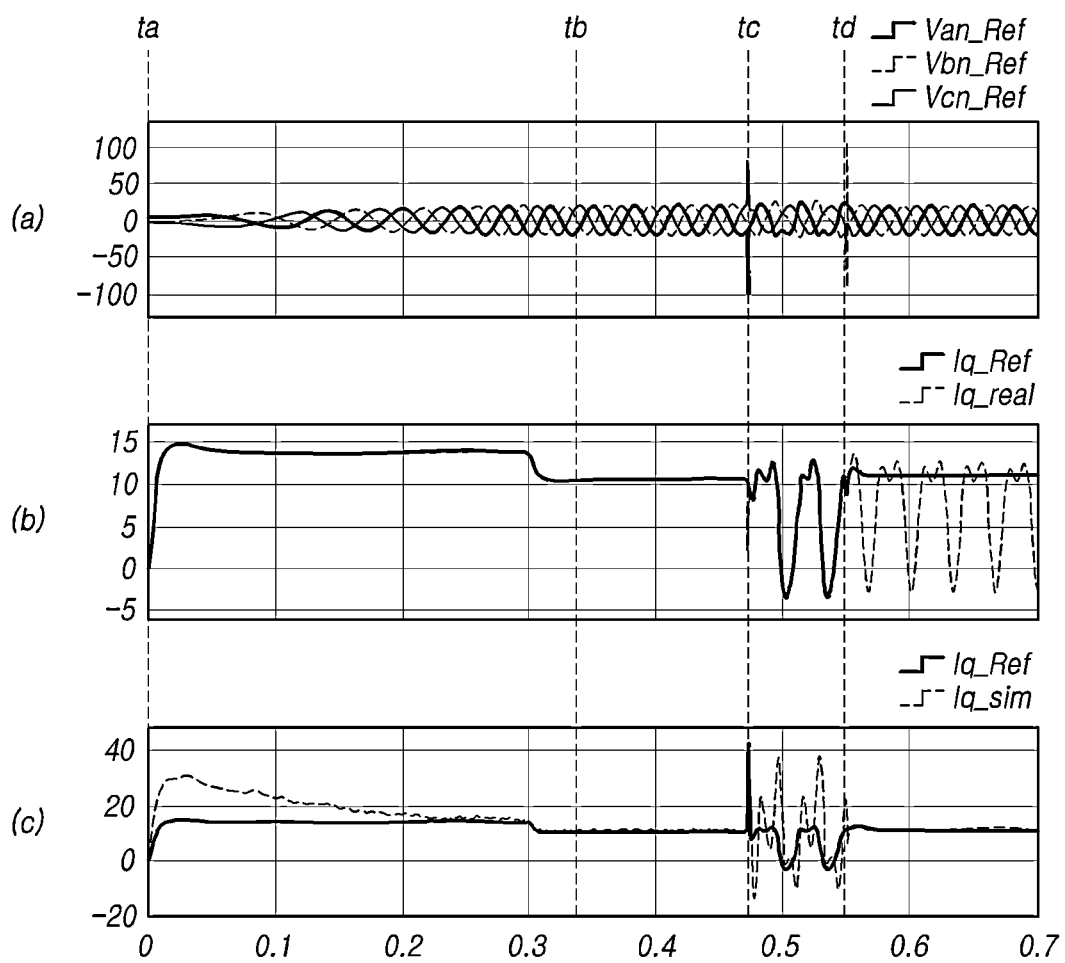

FIGS. 8 and 9 are diagrams for explaining the operation of a motor control method according to an embodiment of the present disclosure.

FIGS. 8 and 9 illustrate graphs related to determination of the estimated current. According to an example, it is assumed that control is performed at a speed of 600 rpm, and a current of phase A is set to be measured at a fixed value of 10 A if a current sensor of phase A has a failure. In FIGS. 8 and 9, a period from ta to tb represents a transient state after the motor starts to drive. The interval tb to tc represents a steady state in which the motor is controlled in a steady state. Referring to (a) of FIG. 8, there may be controlled at 600 rpm in a steady state.

The period after tc represents a failure state in which a failure occurred in the current sensor of phase A. Referring to (b) of FIG. 8, it is shown that the current value of phase A is not properly output due to a failure of the current sensor of phase A.

After a failure occurs, the motor control device may detect a failure at time td and perform sensorless control by calculating an estimated current ((c) of FIG. 8). Referring to (b) of FIG. 9, it is shown that the q-axis current calculated using the actually detected A-phase current has a difference between a reference value Iq_Ref and an actual value Iq_real.

In contrast, referring to (c) of FIG. 9, it is shown that the reference value Iq_Ref and an estimated value Iq_sim of the estimated current calculated through the sensorless control are equal to each other after td. That is, according to the motor control method of the present disclosure, a speed tracking is possible using the fault tolerance control even if the current sensor has a failure.

Accordingly, if a failure occurs in the current sensor of the motor control device, a control signal for the motor may be generated by determining an appropriate estimated current according to the number of current sensors having a failure, so that it is possible to provide a motor control device, a motor control method, and a steering device capable of safely steering even if a failure occurs in a current sensor of the motor control device.

The present disclosure described above may be implemented as computer readable codes in a medium recording a program. The computer-readable medium may include all types of recording devices storing data capable of being read by a computer system is stored. Examples of computer-readable media may include a hard disk drive (HDD), a solid state disk (SSD), a silicon disk drive (SDD), ROM, RAM, CD-ROM, magnetic tape, floppy disk, optical data storage device, and may also include those implemented in the form of a carrier wave (e.g., transmission over the Internet). In addition, the computer may include the controller 120 of the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A motor control device comprising:
    three current sensors provided in each phase of a three-phase inverter connected to a motor to detect a current of each phase; and
    a controller configured to generate a control signal for the motor based on a detected current, and, if a failure occurs in at least one of the three current sensors, determine an estimated current based on the number of faulty current sensors with the failure and generate a control signal for the motor based on the estimated current, wherein, if a failure occurs in two or more current sensors among the three current sensors, the controller determines the estimated current by a sensorless control equation based on an angular velocity measured at the motor, wherein the sensorless control equation is an equation to determine a d-axis current and a q-axis current on a d-q axis rotation coordinate system as the estimated current using d-axis and q-axis inductances (Ld, Lq) and a stator winding resistance (Ra) of the motor.

2. The motor control device of claim 1, wherein, if a failure occurs in one current sensor among the three current sensors, the controller determines the estimated current based on the currents detected by two normal current sensors.

3. The motor control device of claim 1, wherein the controller determines whether of a failure of the three current sensors based on a difference between a value of the detected current and a reference value.

4. A motor control method comprising:
  detecting current of each phase by three current sensors provided in each phase of a three-phase inverter connected to a motor;
  determining a failure of each of the three current sensors;
  generating a control signal for the motor based on the detected current, and determining whether of a failure of at least one current sensor among the three current sensors;
  determining an estimated current based on the number of faulty current sensors with the failure; and
  generating a control signal for the motor based on the estimated current,
  wherein, if a failure occurs in two or more current sensors among the three current sensors, the determining includes determining the estimated current by a sensorless control equation based on an angular velocity measured at the motor,
  wherein the sensorless control equation is an equation to determine a d-axis current and a q-axis current on a d-q axis rotation coordinate system as the estimated current using d-axis and q-axis inductances (Ld, Lq) and a stator winding resistance (Ra) of the motor.

5. The motor control method of claim 4, wherein determining an estimated current comprises determining the estimated current based on the currents detected by two normal current sensors if a failure occurs in one current sensor among the three current sensors.

6. The motor control method of claim 4, wherein determining a failure comprises determining whether of a failure of the three current sensors based on a difference between a value of the detected current and a reference value.

7. A steering device comprising:
  a motor;
  a three-phase inverter;
  three current sensors provided in each phase of the three-phase inverter connected to the motor to detect a current of each phase; and
  a controller configured to generate a control signal for the motor based on a detected current, and, if a failure occurs in at least one of the three current sensors, determine an estimated current based on the number of faulty current sensors with the failure and generate a control signal for the motor based on the estimated current,
  wherein, if a failure occurs in two or more current sensors among the three current sensors, the controller determines the estimated current by a sensorless control equation based on an angular velocity measured at the motor,
  wherein the sensorless control equation is an equation to determine a d-axis current and a q-axis current on a d-q axis rotation coordinate system as the estimated current using d-axis and q-axis inductances (Ld, Lq) and a stator winding resistance (Ra) of the motor.

8. The steering device of claim 7, wherein, if a failure occurs in one current sensor among the three current sensors, the controller determines the estimated current based on the currents detected by two normal current sensors.

9. The steering device of claim 7, wherein the controller determines whether of a failure of the three current sensors based on a difference between a value of the detected current and a reference value.

* * * * *